United States Patent [19]

Javan

[11] 4,287,486

[45] Sep. 1, 1981

[54] LASER RESONATOR CAVITIES WITH WAVELENGTH TUNING ARRANGEMENTS

[75] Inventor: Ali Javan, Cambridge, Mass.

[73] Assignee: Massachusetts Institute of Technology, Cambridge, Mass.

[21] Appl. No.: 38,540

[22] Filed: May 14, 1979

Related U.S. Application Data

[63] Continuation of Ser. No. 654,100, Feb. 2, 1976.

[51] Int. Cl.³ .............................................. H01S 3/10
[52] U.S. Cl. .......................... 331/94.5 C; 331/94.5 M
[58] Field of Search ..................... 331/94.5 C, 94.5 D, 331/94.5 M; 330/4.3

[56] References Cited

U.S. PATENT DOCUMENTS

| | | | |
|---|---|---|---|
| 3,675,154 | 7/1972 | Duguay et al. | 331/94.5 T |
| 3,766,488 | 10/1973 | Kohn | 331/94.5 L |
| 3,774,121 | 11/1973 | Ashkin et al. | 331/94.5 C |

*Primary Examiner*—William L. Sikes
*Attorney, Agent, or Firm*—Arthur A. Smith, Jr.; John N. Williams

[57] ABSTRACT

Novel laser resonator cavities and laser wavelength tuning arrangements are disclosed. A pair of similar spectral dispersion means achieve in the resonator both a colinear region for rays of different wavelengths and a region in which rays of different wavelengths coextend separated and substantially parallel. Amplifying medium in an optical cavity following at least a first dispersion means, preferably in the parallel region of a laser having paired dispersion means, enable amplification at the different wavelengths while limiting their coupling via the amplifying medium. One or a number of apertures disposed in a dispersed path within a laser cavity are positioned to transmit a selected ray or rays and to block rays of unwanted wavelength whereby laser oscillation wavelength is determined. The above features are variously combined to achieve colinear output beams of various wavelengths and injection-type control of laser oscillation. Variable reflecting optics, e.g., a rotary mirror in a dispersed path, preferably in the near-parallel region of a laser having paired dispersion means, select different dispersed rays for reflection, enabling, e.g., rapid frequency scanning in a colinear output beam.

23 Claims, 10 Drawing Figures

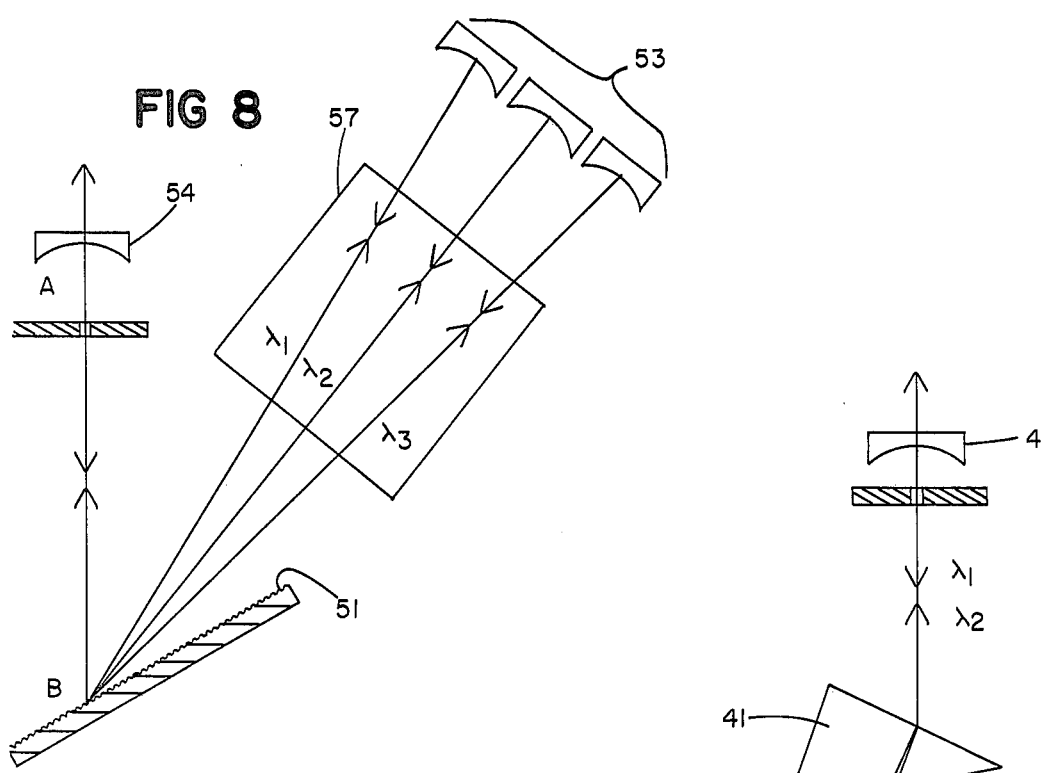
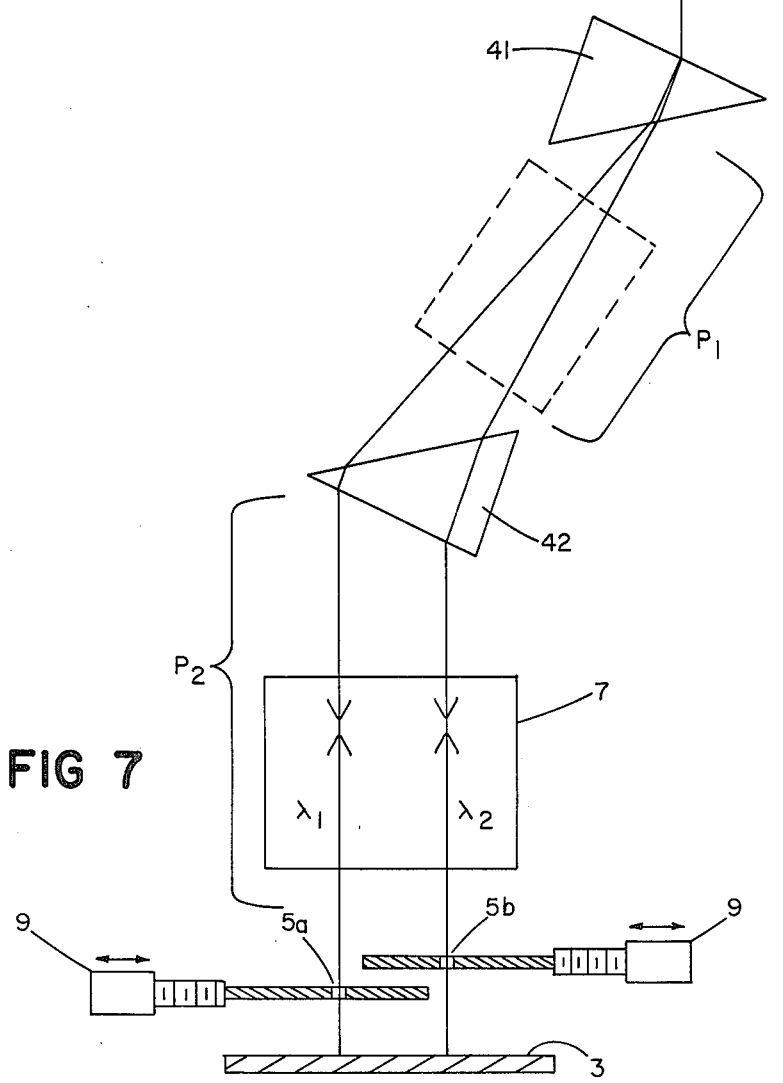

U.S. Patent Sep. 1, 1981 Sheet 5 of 5 4,287,486
FIG 9
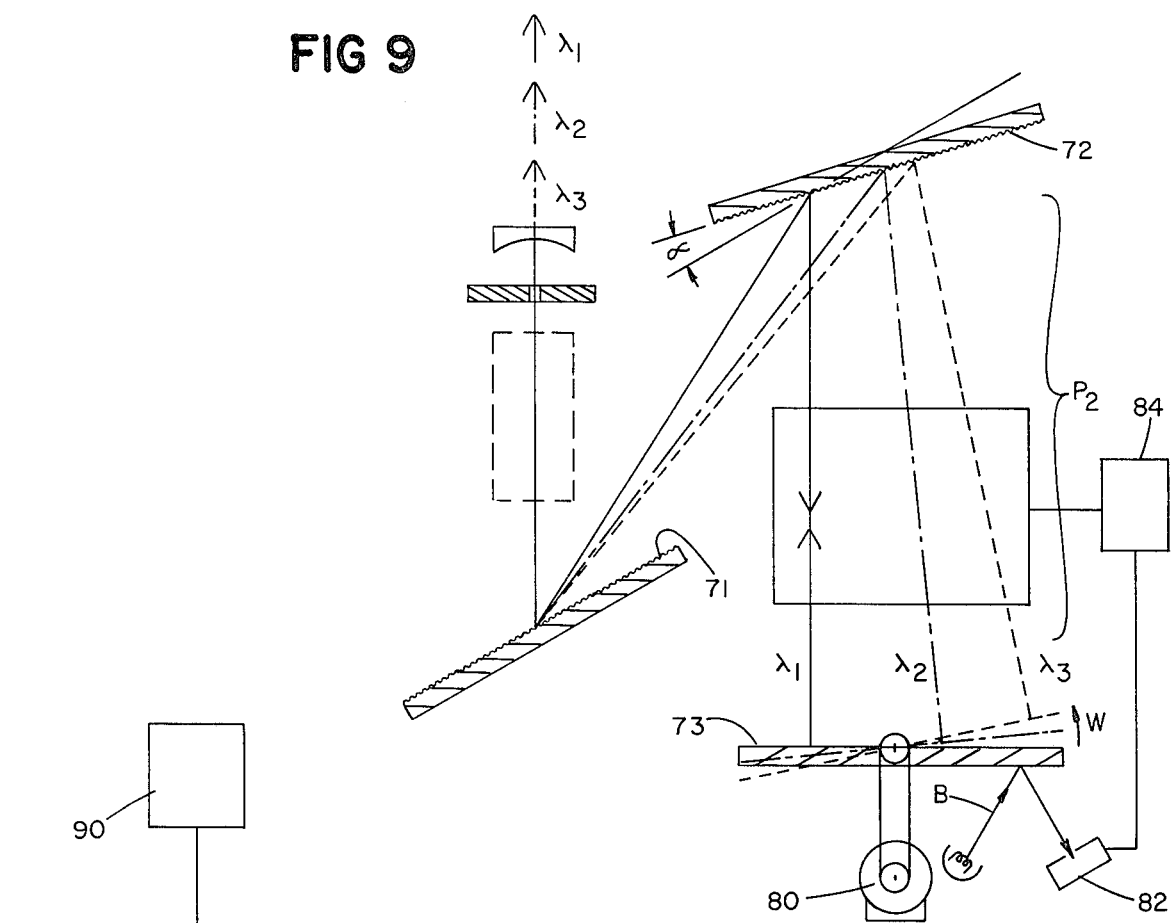
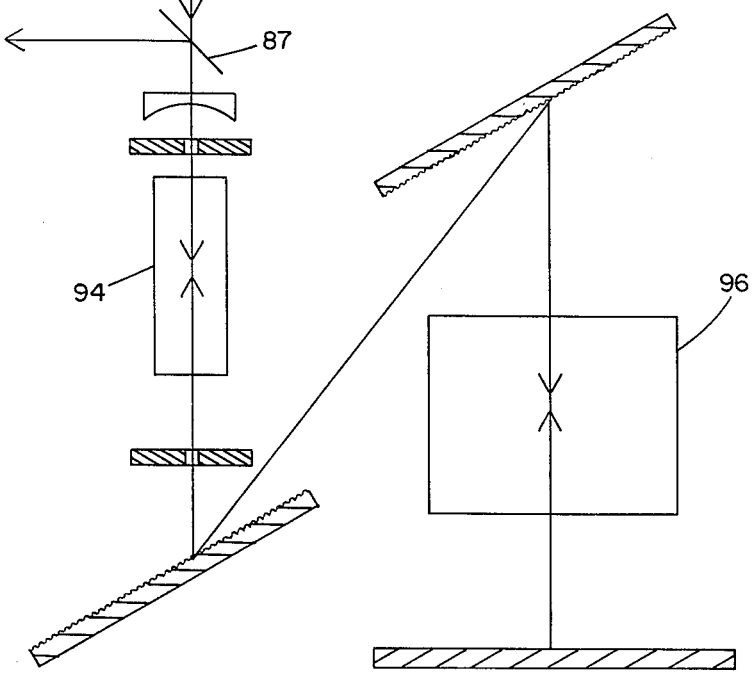
FIG 10

LASER RESONATOR CAVITIES WITH WAVELENGTH TUNING ARRANGEMENTS

The Government has rights in this invention pursuant to Contract Nos. F 19628-75-C-0060 NOOO 14-b 67-A-0204-0014 awarded respectively by the U.S. Air Force and the Office of Naval Research of the U.S. Navy.

This is a continuation of application Ser. No. 654,100, filed Feb. 2, 1976.

BACKGROUND OF THE INVENTION

This invention provides novel designs of laser resonators and laser wavelength tuning arrangements.

A typical example of existing methods for tuning the wavelength of a broad-band laser employs a laser resonator cavity consisting of a partially (or totally) reflecting mirror and one grating.

The grating is used in Littrow configuration at the oscillating wavelength, by which the ray at the oscillating wavelength is reflected back upon itself. For detailed description of a grating in Littrow configuration and other properties of a grating see, for example: Principles of Optics by Born and Wolf., Pergamon Press, New York (1959).

Such a resonator will provide regenerative feedback at the wavelength for which the grating angle is in Littrow with respect to the resonator's axis (determined by the direction normal to the resonator's fixed mirror). A broad-band amplifying medium placed within this resonator produces laser oscillation at the wavelength where the grating acts in Littrow, or in certain cases at a few closely spaced wavelengths near the peak of the grating's resolving band-width and determined by the various resonator modes which are generally spaced in frequency by $c/(2L)$. Keeping the resonator mirror fixed and changing the grating angle changes the wavelength of the ray which will behave in Littrow as it propagates along the resonator axis. This then provides a means to wavelength tune a laser oscillator.

It is to be noted that such turning of the grating is in general used to provide coarse wavelength tuning over a wide region. Fine tuning of the laser is then obtained by keeping the grating angle fixed and changing the spacing between the mirror and the grating by a small amount. There are well known methods, such as piezoelectric tuning, where the latter can be achieved stably.

In other examples of existing methods of tuning, a laser cavity is employed in which a grating is fixed in non-Littrow position at least for some frequencies, and mirrors or Littrow gratings are placed to reflect rays of selected wavelengths diffracted by the grating, back upon themselves to the original grating, thence to the first mirror, see FIG. 2, Osgood, Sackett and Javan, *Measurement of vibrational-vibrational exchange rates for excited vibrational levels* $(2 \leq v \leq 4)$ *in hydrogen flouride gas*, The Journal of Chemical Physics, Vol. 60, No. 4, Feb. 15, 1974. See also U.S. Pat. No. 3,928,817 and Friesem, Ganiel and Neumann, *Simultaneous multiple wavelength operation of a tunable dye laser*, Appl. Phys. Lett., Vol. 23, No. 5, Sept. 1, 1973.

Other arrangements for selection of wavelength or for simultaneous oscillation at multiple wavelengths exist, for example those shown in U.S. Pat. No. 3,872,407 and in Lotem and Lynch, *Double-wavelength laser*, Appl. Phys. Lett., Vol. 27, No. 6, Sept. 15, 1975. These and other prior art arrangements have disadvantages which the present invention overcomes.

SUMMARY OF THE INVENTION

According to one aspect of the invention a pair of similar spectral dispersion means are provided within the laser cavity, the first dispersion means arranged to disperse a beam of restricted cross-section coming from first reflection optics to a first path with rays at angles dependent upon their wavelength, the second dispersion means arranged to receive rays from the first path and to disperse the rays to a second path in which rays of different wavelength coextend substantially parallel to each other with distance of separation dependent upon wavelength and second reflecting optics constructed to regeneratively reflect the rays back to the second and first dispersion means and first reflecting optics. In preferred embodiments a single reflecting optics unit serves the function of regenerative reflection for spatially separate rays of various wavelengths.

According to another aspect of the invention, a laser amplifying medium is provided in an optical cavity following first reflecting optics and a spectral dispersion means, whereby rays of different wavelengths passing through the medium are displaced spatially, thereby enabling their amplification to occur substantially in different regions of the amplifying medium and thus limiting their coupling via the amplifying medium.

In certain embodiments the amplifying medium produces multiple wavelengths from different transitions of a gas, e.g., from a given molecular rotation-vibration band, and the spatial separation of the rays serves to limit collisional coupling. In other embodiments the amplifying medium produces multiple wavelengths sufficiently close in frequency to be coupled to the same transition by homogeneous broadening and the spatial separation of rays serves to limit coupling of the wavelengths via such broadening, e.g., as in pressure-broadened gas lasers and in dye lasers. In all such cases, parallelism of the spatially separated rays while propagating through the amplifying medium, achieved by placing the amplifying medium following both first and second spectral dispersion means as above mentioned, facilitates the design and provides uniformity in the conditions for rays at the various wavelengths.

According to another aspect of the invention, two volumes of amplifying medium are employed, one disposed in the common beam between first reflecting optics and first spectral dispersion means, and the other provided in a dispersed path where the rays of different wavelengths are spatially separate, thus to avoid coupling via the amplifying medium. By exciting both amplifying media, a wavelength produced in the amplifying medium in the dispersed path can be present in the common beam path to cause further excitation of laser oscillation at the wavelength in the second amplifying medium there. In certain such embodiments the amplifying medium in the dispersed path is adapted to produce multiple wavelengths. Advantageously, e.g., where the amplifying medium in the dispersed path and its excitation system is pulsed at low power, its excitation is triggered first in time, followed with a predetermined delay by triggering of excitation of the lasing process in the common path according to an injection phenomenon caused by the weak radiation from the amplifying medium in the dispersed path.

In the embodiments mentioned, in certain instances, a modulating means, either active or passive, is disposed in the common beam path between the first mirror means and the first spectral dispersion means, arranged to modulate in unison the different wavelengths or to provide one or multiple injection frequencies for amplifying medium elsewhere in the resonator.

The invention also features one or more apertures disposed in a dispersed path, positioned to transmit a selected ray or rays whereby the wavelength of laser oscillation is determined. In preferred embodiments a set of these apertures is adjustably positioned across the dispersed path for wavelength tuning.

In various embodiments, colinear output of the numerous wavelengths is provided through the first reflecting optics of the cavity or where the dispersion means is a diffraction grating, by zero order diffraction from a diffraction means within the cavity that receives colinear beams from the first reflecting optics.

In various embodiments adapted for tuning or multiple wavelength selection, the second reflecting optics employed to define the laser cavity comprises an extended plane mirror constructed to reflect substantially parallel rays back upon themselves to the mentioned pair of dispersion means while in other embodiments the second reflecting optics may be a long focal length concave reflector, e.g., 10 times longer than the optical path in the resonator. In still other embodiments, variable optics, e.g., a rotary mirror, is employed to select wavelength or to achieve rapid frequency scanning across a predetermined wavelength band or bands.

According to the invention, where the dispersion means is e.g. a grating, the critical resonator components (the gratings, mirrors, etc.) can however be kept at a fixed angle with respect to the laser axis and locked in position. Coarse frequency tuning is then accomplished by moving an aperture within the resonator, e.g., by translation, in a way which is considerably less critical than turning a grating about its axis. Such configuration lends itself to a rugged mechanical design free from microphonic and jitter effects.

The invention provides a new way to tune the frequency of a broad-band laser oscillator over a wide region. In one embodiment, the invention makes it possible to operate the broad-band laser on a number of frequencies simultaneously, relatively strongly, with each of the frequencies controllable independently, while the laser beams corresponding to the various simultaneously oscillating frequencies can all leave the laser oscillator colinearly. In this case, these independently controllable laser beams will be overlapping at the laser output along their propagation paths—optimally, the basic dispersion spread will determine the extent of their overlap.

The colinearity of such output beams of many different frequencies is an important feature. This will obviate in certain cases the need to use an alternate method in which several lasers, each oscillating at the different frequencies, are used and their outputs combined into a colinear direction through cumbersome use of several beam splitters. The independent controllable multifrequency operation of the device, with a colinear output, will make it possible to excite or probe simultaneously several transitions of an atomic or molecular system. Multi-quantum excitation has important application in laser initiated chemistry, molecular photodissociation, molecular or atomic photoionization, isotope separation, and others.

These and other objects, features, and advantages of the invention will be understood from the following description of preferred embodiments, taken in conjunction with the drawings wherein.

BRIEF DESCRIPTION OF THE DRAWINGS

FIG. 7 is a diagrammatic view employing a pair of oppositely directed prisms for creating the different paths;

FIG. 8 is a diagrammatic view of another embodiment of the separated path amplification feature of the invention;

FIG. 9 is a diagrammatic view of an embodiment featuring chirping across a frequency band; and FIG. 10 is a diagrammatic view of an injection locked laser according to the invention.

DESCRIPTION OF PREFERRED EMBODIMENTS

Figure 1:
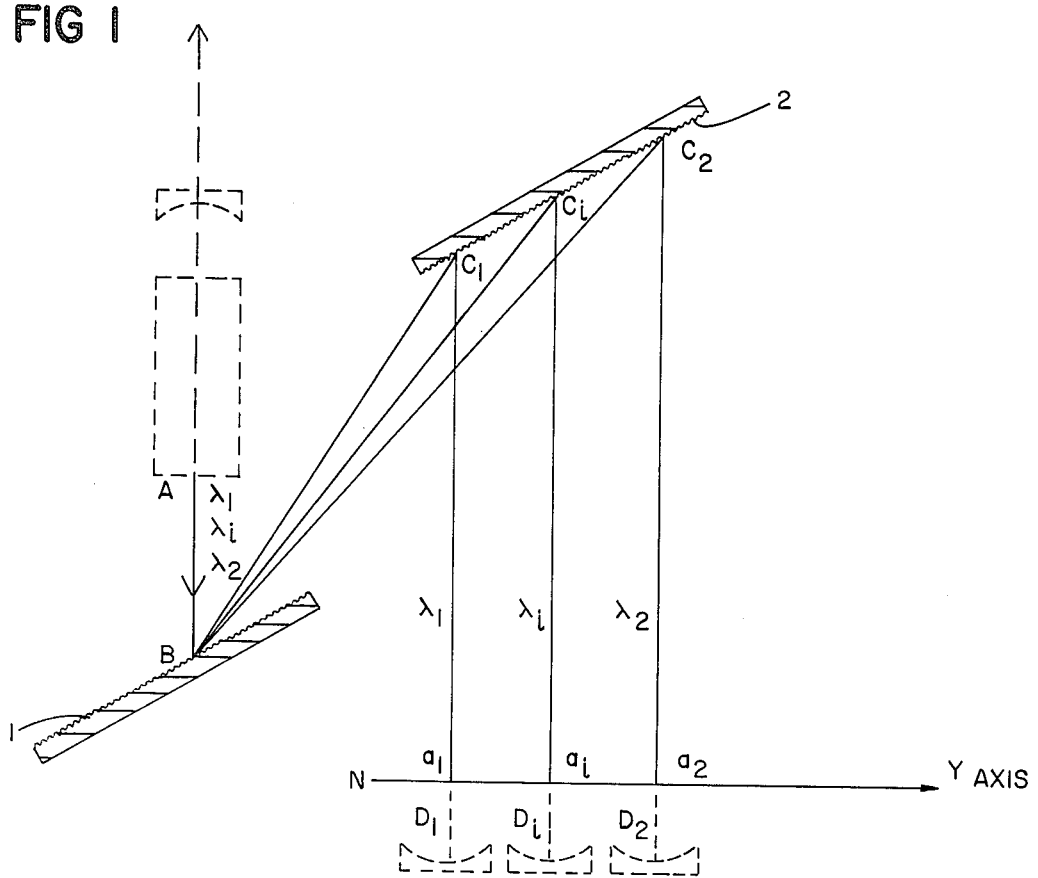
FIG. 1 is a diagrammatic view of a multiple grating optical path employed in the invention and FIGS. 2, 3, 4 and 5 are diagrammatic views of alternative lasers employing the optical path of FIG. 1.

Referring to FIG. 1, consider a ray at a wavelength $\lambda_1$ incident on a grating along the AB direction. The ray will be diffracted from the grating in various orders. As an example, consider grating 1 which is blazed so that most of the energy is diffracted in the first order. Suppose this grating is to diffract the ray at the wavelength $\lambda_1$ in the direction $BC_1$. (Note that AB direction is not in Littrow at $\lambda_1$.) Consider now a second ray at an appreciably different wavelength, $\lambda_2$, to be incident on the same grating, again along the same AB direction. For this ray, the diffracted ray will be along a path $BC_2$ different from $BC_1$. A second grating 2 which may be an exact replica of the first grating may then be placed at some distance from the first grating and parallel to the first grating. The separation between the two gratings is selected so that, for a given beam size, the $\lambda_1$ and $\lambda_2$ rays incident on the second grating are resolved and nonoverlapping. Inspection shows that, for the two gratings parallel to each other, the two rays diffracted from the 2nd grating will follow directions $C_1D_1$ and $C_2D_2$ which are parallel to one another.

Consider now another beam at an intermediate wavelength $\lambda_i$ (between $\lambda_1$ and $\lambda_2$, say $\lambda_1 \geq \lambda_i \geq \lambda_2$), to be again incident on grating 1 along the common path AB. The diffracted ray at the wavelength $\lambda_i$ will follow the paths AB, $BC_i$, $C_iD_i$. Note that $C_iD_i$ is parallel to the other two rays in the CD region.

Consider now a plane N perpendicular to the paths of the rays diffracted from grating 2. The intercept of the $\lambda_1$, $\lambda_i$, and $\lambda_2$ rays on this plane follow a direction perpendicular to the CD path, defined as the y axis. If the wavelength of a ray incident along the fixed AB path is continuously tuned from $\lambda_1$ to $\lambda_2$, after diffraction from the first and the second gratings, its intercept with the fixed plane will continuously move along the y direction from $a_1$ to $a_2$.

Figure 2:
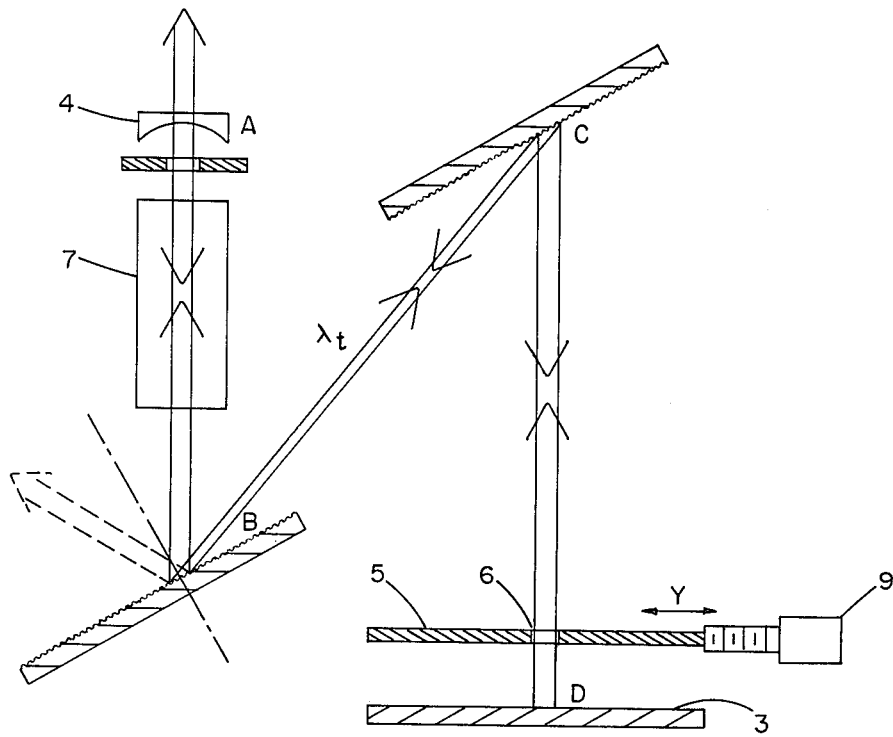

Referring to FIG. 2, a resonator is constructed by placing a long planar reflecting mirror 3 perpendicular to the CD path, and another reflecting mirror 4 perpendicular to the common AB path. An aperture member 5 defining aperture 6 bounded by blocking walls is disposed in front of the long mirror, adjustable by micrometer screw 9. The wavelength region where the resonator can provide high-Q regenerative feedback now depends upon the position of the aperture 6 along the y direction. Further, by moving the aperture along the y direction from, say, $a_1$ position to $a_2$ position in FIG. 1, the resonator is coarse frequency tuned from $\lambda_1$ to $\lambda_2$, the extended mirror 3 regeneratively reflecting the wavelength back upon itself wherever the aperture 6 is positioned.

An amplifying medium 7 is provided with a broad amplification band-width extending at least from $\lambda_1$ to $\lambda_2$. For a laser to be oscillated on a single tunable frequency, the amplifying medium can be placed in either the common arm AB, or in the region BC or in the CD region. A more convenient location for this is the AB region. The frequency tuning of the tunable wavelength $\lambda_t$ is then obtained by moving the aperture 6.

Figure 3:
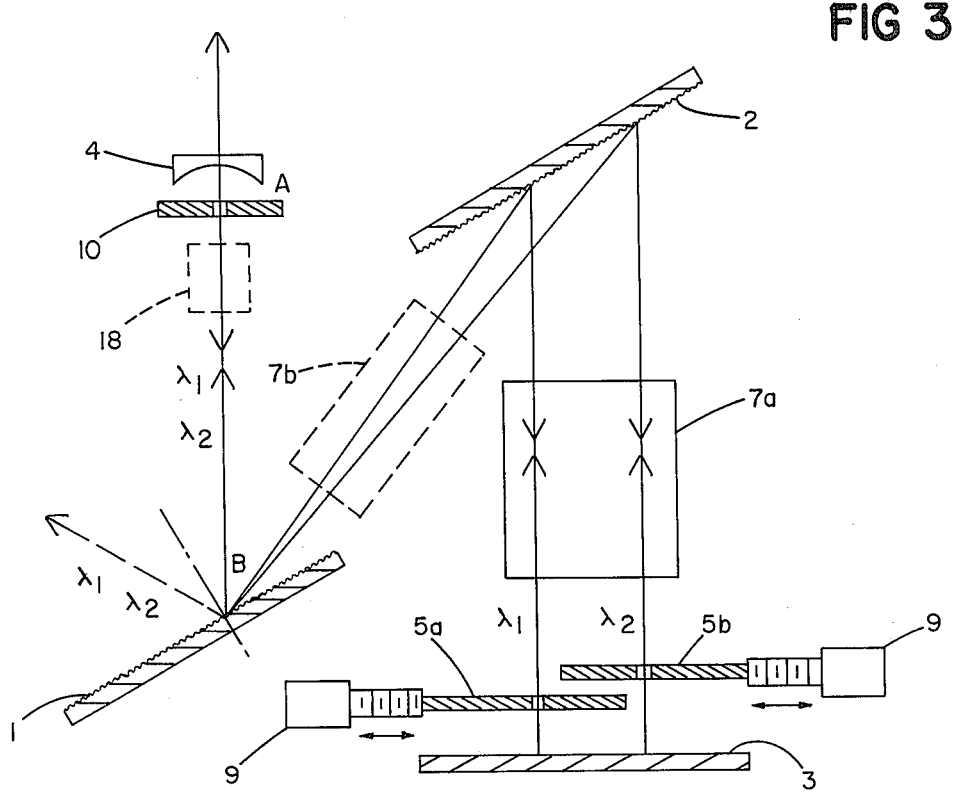

Referring to the resonator of FIG. 3, regenerative feedback is provided simultaneously at several wavelengths, by providing several separate apertures along the y axis; specifically the figure shows a system tunable at two different wavelengths chosen by two apertures, 5a, 5b.

The cross-section of the common arm beam AB is restricted, as by limiting aperture member 10, to restrict the point of incidence of rays from mirror 4, to ensure well defined multi-wavelength operation. (In place of the aperture member, the beam aperture may be similarly restricted by limiting the length of the grating 1, or limiting the size of mirror 4.)

A basic feature of this multi-wavelength resonator is that it provides regions, such as BC and CD, where the directions for regenerative feedback at two different wavelengths are spatially resolved and nonoverlapping. By placing the amplifying medium 7a, 7b in such regions, highly troublesome coupling of two (or several) oscillating wavelengths by the amplifying medium is avoided. Such coupling effects arise from a variety of nonlinear effects, for instance homogeneous broadening of a single transition as in dye lasers or high pressure gas lasers, or collisional coupling of different transitions in a given rotation vibration band of a gas. In either case there is a tendency for the energy to be concentrated mainly in one wavelength and deprived from another, an effect which can be diminished or entirely avoided by causing (as in FIG. 3), the rays at different wavelengths to occupy different regions in the amplifying medium placed within the resonator. Placement of the amplifying medium 7a in the path CD has the further advantage that the various wavelengths are parallel, and of equal path length through the medium. (In contrast, with the coupling effects mentioned, it is realized that diffusion coupling between spaced points in the medium, being relatively time dependent, will not defeat the isolation here achieved, particularly if relatively short pulses are employed.)

Another advantage of the embodiment of FIG. 3 is that the simultaneously oscillating frequencies can all be coupled out of the resonator colinearly by partially transmitting mirror 4 in the common AB arm. The coupling can also be obtained colinearly via zero-order diffraction from the first grating, via the arrow in dotted lines. The zero order diffraction is one for which the angle of diffracted ray with respect to the normal to the grating is exactly the same as the incident angle but it occurs on the opposite side of the normal to the grating, i.e., the diffracted angle is exactly the negative of the incident angle. Since, in this embodiment, the angle of incidence of common arm AB is the same irrespective of the wavelengths (i.e., the rays corresponding to the different wavelengths are all incident along the AB path), the zero order diffraction from the first grating occurs colinearly for all wavelengths, along the dotted line path in FIG. 3.

The above resonator is used to obtain an independently controllable multi-frequency laser, using a molecular rotation-vibration band. For this, the amplifying medium is placed in the BC or CD region. At a low gas pressure, the independent frequencies will consist of oscillations at the different rotation vibration transitions within the band. At elevated pressures where collision broadening in the amplifying medium results in overlapping of all of the transitions within the band, continuous frequency tuning can be obtained over the entire band.

For modulation of all frequencies a modulator 18 is placed in the common arm AB, either an active modulator, e.g., an electro-optic modulator, or a passive modulator, e.g., a saturable absorbing medium, for forming short pulses.

Figure 4:
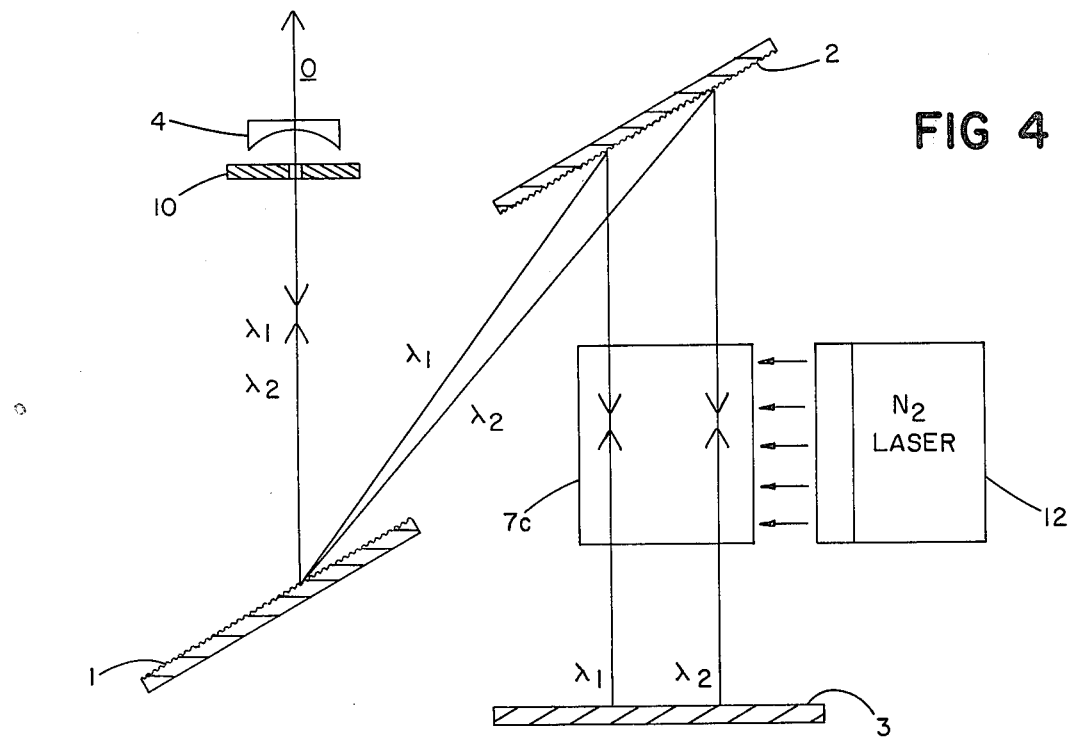

Referring to FIG. 4, in this embodiment the amplifying medium is a dye laser 7c (e.g., rhodamine 6 g (R6 g) pumped by a nitrogen laser 12) and the different wavelengths $\lambda_1, \lambda_2$, colinear in the output 0, are spatially separate and parallel in the dye laser with the advantages of avoiding coupling by homogeneous broadening via the amplifying medium.

Figure 5:
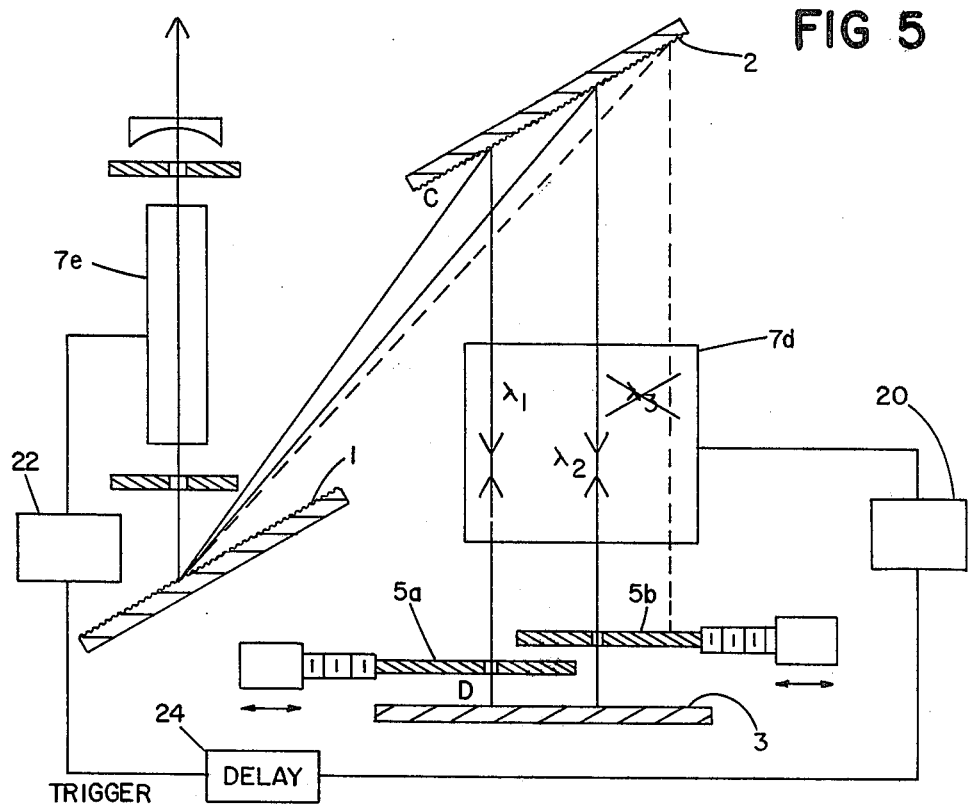

Referring to FIG. 5, here amplifying medium 7d with low power pulsed excitation source 20, is provided in the parallel CD arm, while an additional amplifying medium 7e provided with high power pulsed excitation source 22 and subject by itself to coupling difficulties is placed in the common arm AB. By predetermined delay 24 it is ensured that excitation source 22 for the common arm fires after pulsing excitation source 20 for the CD arm, but while radiation produced by excitation 20 persists in the resonator. The injecting effects of $\lambda_1$ and $\lambda_2$ produced separately in arm CD force oscillation at both $\lambda_1$ and $\lambda_2$ in the high power medium 7e, despite tendencies to couple via the amplifying medium.

In another mode of operation the excitation of amplifying medium 7d by itself can be kept below the threshold for oscillation. The mere presence of small gain in that medium and the very weak radiation associated with it will be sufficient to trigger the amplifying medium 7e at wavelength determined by the gain characteristics of the 7d amplifying medium. In still another embodiment both the 7d and 7e amplifying medium can be placed in a path where the diffracted rays are spatially resolved according to their wavelength.

As shown, the laser of FIG. 5 is constructed as a $CO_2$ laser for operation in the 10.6$\mu$ band. The adjustable apertures 5a and 5b are translated parallel to plane mirror 3 to positions corresponding for instance to wavelengths of the p(18) and p(20) transitions (blocking the wavelength of the p(16) transition).

Amplifying medium 7d may be a gas laser at a low pressure and of low power and the high power system 7e may comprise a high pressure gas laser employing a photoionization method to produce a uniform high density plasma gain medium. In other embodiments the amplifying medium 7d can operate in CW, or the amplifying medium 7e may be pulsed so that gain exists to both gain media 7d and 7e simultaneously.

Figure 6:
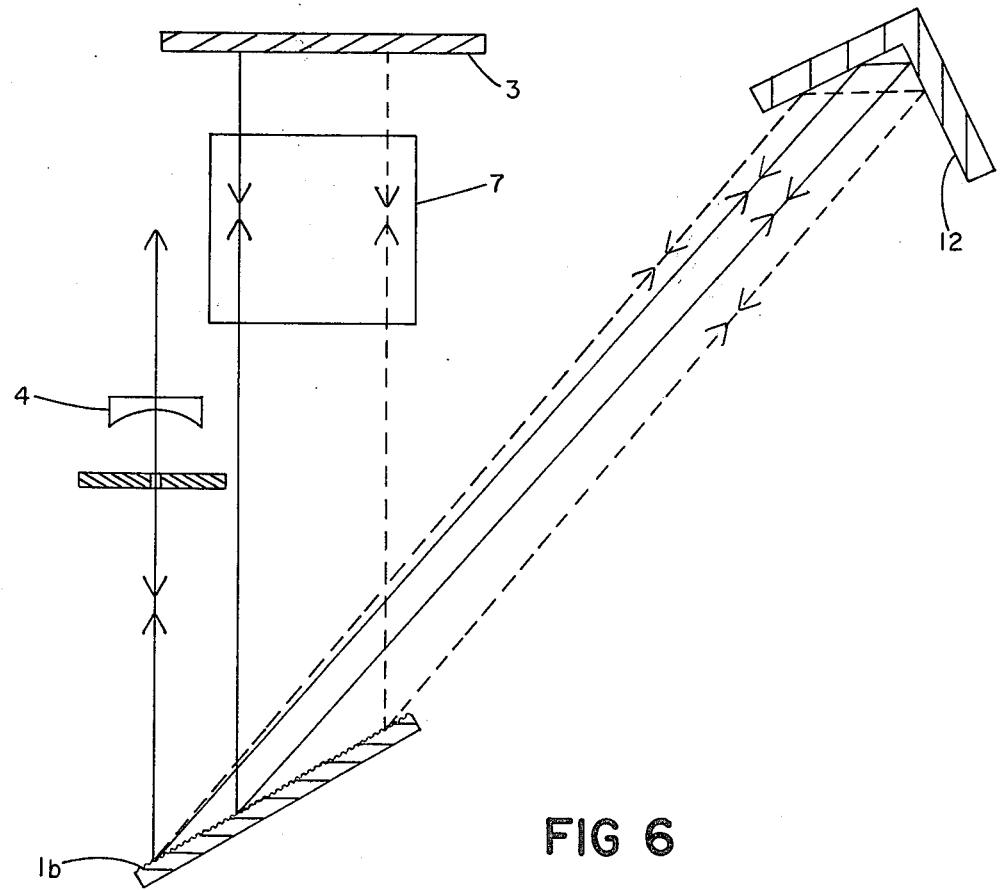
FIG. 6 is a diagrammatic view, similar to the foregoing, of an embodiment employing a single grating and reflective optics.

Referring to FIG. 6, similar effects to those of FIG. 3 are obtained employing a single grating 1b, two sections of which are employed by reflection, e.g., by corner cube 12 as shown. Thus the cavity extends from mirror 4 to grating 1b, thence diffracted to corner cube 12, then reflected back to grating 1b, then diffracted with parallel paths, through amplifying medium to mirror 3. Here, as well as in FIGS. 2, 3, etc., an extensive concave mirror of relatively large focal length, e.g., focal length of 30 meter in comparison to a cavity length of 1 to 3 meters, can be employed in lieu of the plane mirror, with advantages in ease of alignment, but in some cases with sacrifice in breadth of band width, or requirement of a smaller common arm beam cross-section.

Referring to FIG. 7, other dispersive means can be emloyed, e.g., the parallel prisms 41 and 42, which are oppositely directed, the first prism 41 refracting the common beam to the first refracted path $P_1$ and the second prism refracting the beam to refracted path $P_2$, thence to mirror 3 for regenerative reflection. The amplifying medium in one or both diffracted paths $P_1$ and $P_2$ can be employed in accordance with principles mentioned above.

Referring to FIG. 8, here a single grating 51 is employed, serving to diffract various wavelengths $\lambda_1, \lambda_2, \lambda_3$ of a broad-band beam of restricted cross-section in arm AB. A laser medium 57 is provided in the diffracted path whereby laser amplification of each wavelength occurs while the rays are separated. The rays are returned back upon themselves, by a mirror arrangement 53, through the amplifying medium, to the grating, thence colinearly to partially transmissive mirror 54 through which a colinear output at various frequencies is obtained. The advantages of physical separation of the rays in the amplifying medium are present here too.

Referring to the embodiment of FIG. 9, the laser here shown is similar to that of FIG. 3, except that the two substantially identical gratings 71, 72 are offset slightly from parallel, angle $\alpha$, so that the rays in the second diffracted path $P_2$ are slightly out of parallel. Also, the mirror 73 is mounted to rotate, e.g., by constant speed drive 80 or by a limited rotation, oscillating motor. By feedback of the position of the mirror, employing light beam B reflected from the back of the mirror to sensor 83, laser excitation source 84 is triggered as the rotating mirror approaches perpendicular relation to the first wavelength $\lambda_1$. Thereby, $\lambda_1$ is regeneratively reflected and laser oscillation occurs at $\lambda_1$. As the mirror progresses to perpendicular relation to other rays, in sequence, regenerative reflection shifts to those wavelengths. Thus the laser is chirped to produce a laser pulse over which the frequency changes during time due to rotation of the mirror. Here, the amplifying medium can be placed in the non-common arms CD or BC and apertures can be employed in the diffracted path to restrict laser oscillation to selected frequencies.

An external source of radiation can also be employed to advantage with the novel resonator of the invention. According to the embodiment of FIG. 10, a laser cavity similar to that of FIGS. 3 or 4 is employed. The output of an external laser 90, preferably after passing through isolator 92, enters the cavity through the first mirror and locks laser oscillation produced by amplifying medium 94 or 96. Output is obtained through beam splitter 87.

One advantage offered by the resonator cavity for injection purposes lies in the many resonator modes offered by the arrangement. Even further resonator modes can be obtained in certain cases by using an unstable laser construction, e.g., by use of convex mirrors. The many resonator modes assures that a resonant path is found by rays of the desired wavelength despite variations in the optical properties of the resonator, e.g., variation in the refractive index of the amplifying medium, etc.

What is claimed is:

1. In a laser comprising an optical cavity defined by first and second reflecting optics, a first amplifying medium within the cavity and means to excite said medium to produce lasing conditions, said laser including means to restrict the laser beam to a common path for all wavelengths in the region of said first reflecting optics, the improvement comprising means including spectral dispersion apparatus disposed within the optical cavity, positioned to receive a beam of restricted cross section in said common path from said first reflecting optics and to disperse said beam to a plurality of paths in which rays of different wavelength are laterally spaced apart, said paths passing through said first amplifying medium whereby rays differing in wavelength can be subjected to amplification in different spatially separated portions of said first amplifying medium, said second reflecting optics constructed to reflect regeneratively said rays back along said paths, in laterally spaced apart condition through said portions of said first amplifying medium for further amplification, thence from said spectral dispersion apparatus along said common path to said first reflecting optics, said laser including a second amplifying medium disposed in the common beam path between said first reflecting optics and said spectral dispersion apparatus, in which path said rays are in a non-resolved, overlapping relation, and means to excite both said first and said second amplifying medium whereby a given wavelength amplified in a portion of said first amplifying medium can be present in said common beam path to cause excitation of laser oscillation at said wavelength in said second amplifying medium.

2. The laser of claim 1 wherein said portions of amplifying medium through which said dispersed rays pass is of a type productive of detrimental coupling of different wavelengths when said wavelengths are colinear, said spatially separated portions enabling amplification at the different wavelengths without detrimental coupling via the amplification medium.

3. The laser of claim 1 wherein said portions of amplifying medium through which said dispersed rays pass comprise adjacent portions of a volume of gas having a characteristic given rotation-vibration band having different transitions from which different wavelengths can emit when said medium is energized, the wavelengths subject to detrimental collisional coupling, and the distance of spatial separation of said dispersed rays in said volume of gas being of predetermined value to limit collisonal coupling.

4. The laser of claim 1 wherein the amplifying wavelength characteristic of said first and of said second amplifying medium are cooperatively predetermined such that multiple wavelengths characteristically produced by said first medium are wavelengths which are susceptible to coupling effects in said second amplifying medium in the absence of supportive radiation at said wavelength produced by said first amplifying medium and passing through said second amplifying medium.

5. The laser of claim 4 wherein separate pulsed excitation sources are provided for said first and said second amplifying medium, and means for delaying excitation of said second amplifying medium relative to said first amplifying medium to ensure presence of rays of said wavelengths in said second medium during initiation of excitation of said second medium.

6. The laser of claim 1 wherein an aperture means is disposed in one of said paths, positioned to transmit a selected ray and block adjacent wavelengths whereby laser oscillating wavelength is determined.

7. The laser of claim 1 wherein both said first and second amplifying medium are excited to lasing level.

8. The laser of claim 1 wherein said first amplifying medium is energized to a condition below lasing level and second amplifying medium is energized to lasing level.

9. In a laser comprising an optical cavity defined by first and second reflecting optics and amplifying medium within the cavity, said laser including means to restrict the laser beam to a common path for a band of wavelengths for the output of said laser, the improvement comprising means including spectral dispersion apparatus disposed within the optical cavity, positioned to receive a beam of restricted cross section in said common path and to disperse said beam, said first and second reflecting optics constructed to reflect regeneratively said rays back and forth in said cavity along a regenerative path for amplification by said amplifying medium, a second source of radiation separate from said amplifying medium for producing radiation at a selected frequency and disposed to transmit said radiation at a relatively weak intensity to follow the said regenerative path, and means to excite both said second source and said first mentioned amplifying medium whereby a given wavelengths originating in said second source can be present in said amplifying medium to determine the wavelength of radiation amplified by said amplifying medium, whereby radiation at the determined frequency and at a relatively high level of intensity can be produced at said output.

10. The laser of claim 9 including a modulating means disposed in the common beam path between said first reflecting optics and said spectral dispersion apparatus, in which path rays of differing wavelength are in a non-resolved, overlapping relation, said modulating means arranged to modulate in unison different wavelengths.

11. The laser of claim 4 wherein said first reflecting optics are partially transparent enabling a colinear output of various wavelengths to propagate therethrough.

12. The laser of claim 9 wherein said amplifying medium is disposed along said common path whereby its amplifying effects can be fully effective regardless of the specific frequency in said band width that is determined by said second source.

13. The laser of claim 9 wherein said second source comprises a second amplifying medium disposed within said optical cavity.

14. The laser of claim 9 wherein said second source is disposed outside of said optical cavity.

15. The laser of claim 14 including an isolator disposed between said second source and means introducing said relatively weak radiation from said source into said cavity.

16. The laser of claim 9 wherein said second source comprises a CW source.

17. The laser of claim 9 wherein said amplifying medium comprises excitable gas.

18. The laser of claim 11 wherein said gas comprises carbon dioxide.

19. The laser of claim 9 wherein both said second source and said amplifying medium are of the pulsed operation type and wherein the means to excite includes a delay means for delaying the excitation of said first amplifying medium until the weak radiation is present therein as a result of excitation of said second source.

20. The laser of claim 9 wherein said second source comprises means for simultaneously producing radiation at a plurality of spaced apart, discrete frequencies at relatively weak intensities, thereby determining a plurality of wavelengths of radiation amplified by said amplifying medium.

21. The laser of claim 20 wherein said means for producing radiation at a plurality of frequencies is disposed in a dispersed path in said cavity following said spectral dispersion apparatus.

22. The laser of claim 21 wherein both said amplifying medium and said means for producing radiation at a plurality of frequencies comprise excitable gas, the gas of said amplifying medium being at a relatively high gas pressure.

23. The laser of claim 9 wherein said amplifying medium comprises excitable gas of a type and at a pressure adapted to produce collision broadening in the amplifying medium resulting in overlapping of all of the transitions within a molecular rotation vibration band whereby said amplifying medium can produce amplification over the entire band.

* * * * *